United States Patent [19]

Suzuki et al.

[11] 4,329,266
[45] May 11, 1982

[54] WATER-DISPERSED COATING COMPOSITION COMPRISING AN ACRYLIC GRAFT POLYMER CONTAINING CARBOXYL GROUPS, HYDROXYL AND/OR AMIDE GROUPS

[75] Inventors: Yukio Suzuki; Naozumi Iwasawa; Tadashi Watanabe, all of Hiratsuka, Japan

[73] Assignee: Kansai Paint Co., Ltd., Hyogo, Japan

[21] Appl. No.: 186,557

[22] Filed: Sep. 12, 1980

[30] Foreign Application Priority Data

Sep. 29, 1979 [JP] Japan .................. 54-124710
Sep. 29, 1979 [JP] Japan .................. 54-124711

[51] Int. Cl.³ ............................................. C08L 61/28
[52] U.S. Cl. ...................................... 524/376; 525/66; 524/376; 524/378; 524/388; 524/504
[58] Field of Search ............... 260/29.4 UA, 29.6 NR, 260/29.6 TA, 29.6 AT, 29.6 PM, 29.6 H; 525/66, 913

[56] References Cited

U.S. PATENT DOCUMENTS 3,821,145 6/1974 Walus .................. 260/29.4 UA

FOREIGN PATENT DOCUMENTS 51-7033 1/1976 Japan .
53-37733 4/1978 Japan .

*Primary Examiner*—Theodore E. Pertilla
*Attorney, Agent, or Firm*—Wenderoth, Lind & Ponack

[57] ABSTRACT

A water-dispersed coating composition comprising (1) a dispersion of a water-dispersible form of an acrylic graft polymer containing carboxyl groups and hydroxyl and/or amide groups in an aqueous medium containing 60 to 90% by weight of water, and (2) an amino resin. The water-dispersible form of this polymer is obtained by neutralizing at least 50% of the carboxyl groups of the polymer with a basic substance. Prior to neutralization, the polymer has an acid value of 15 to 40 and a glass transition temperature of −10° C. to 70° C., and is produced by polymerizing (A) an acrylic copolymer and (B) a mixture of an alpha,beta-ethylenically unsaturated carboxylic acid and another copolymerizable unsaturated monomer. The copolymer (A) and the mixture (B) is selected so that either one of them has hydroxyl and/or amide groups and the difference between the acid value of the copolymer (A) and that of the mixture (B) is from 25 to 200. The present invention also provides a water-dispersed coating composition comprising a dispersion of a water-dispersible form of a self-curable acrylic graft polymer without an amino resin.

27 Claims, No Drawings

WATER-DISPERSED COATING COMPOSITION COMPRISING AN ACRYLIC GRAFT POLYMER CONTAINING CARBOXYL GROUPS, HYDROXYL AND/OR AMIDE GROUPS

This invention relates to novel water-dispersed coating composition. More specifically, it relates to a water-dispersed coating composition which has superior coating properties and gives coated films having superior durability and water resistance and good esthetic effects.

Some water-dispersed coating compositions have been known. These compositions generally contain as a main film-forming component a water-dispersible polymer produced by emulsion-polymerization of a polymerizable unsaturated monomer in water using an emulsifier, or a water-dispersible polymer produced by neutralizing a polymer having carboxyl groups in an amount required for dispersion in water (usually corresponding to an acid value of at least 60) with a basic substance.

A coating composition containing the first-mentioned water-dispersible polymer obtained by emulsion polymerization can have a high solids content because the water-dispersible polymer has the property of being dispersed in a high content in water or a mixture of water and a small amount of a hydrophilic organic solvent. Thus, this type of coating composition has the advantage of being significantly free from "sagging" and "popping" which are the serious defects encountered in the coating of aqueous coating compositions.

The term "sagging" denotes that phenomenon manifested in a wet paint film applied to a vertical or inclined surface by its flowing down along the surface under the influence of gravity.

The term "popping" denotes that phenomenon manifested in a heat-cured paint film by the formation on its surface of traces left after escape of bubbles and/or marks resulting from inclusion of bubbles.

Since, however, the water-dispersible polymer obtained by the emulsion polymerization method contains an emulsifier, a coated film obtained by using a water-dispersed coating composition comprising this water-dispersible polymer has poor water resistance. Furthermore, when such a water-dispersed coating composition is applied to a substrate, the rate of increase of its viscosity is very high, and the levelling property of the composition is insufficient, to making it impossible to obtain a smooth coated film. Another defect is that because the dispersibility of a pigment in the composition is poor, a coated film having superior gloss cannot be obtained. Accordingly, this type of coating composition is unsuitable for applications requiring surface finishes of excellent esthetic properties.

It is often the practice, on the other hand, to introduce a functional group such as a hydroxyl or carboxyl group into the water-dispersible polymer so as to impart heat curability to it. When a polymerizable unsaturated monomer having such a functional group is polymerized by an emulsion-polymerization technique, the resulting polymer has the functional group non-uniformly distributed therein because the functional group has strong affinity for water. Hence, when a water-dispersed coating composition comprising the resulting water-dispersible polymer containing a functional group as a film-forming component is coated on a substrate and heat-cured using a curing agent, non-uniform crosslinking occurs and the resulting cured paint film has poor water resistance, chemical resistance and weatherability.

On the other hand, a water-dispersed coating composition prepared by using a water-dispersible product of a carboxyl-containing polymer, such as an acrylic polymer, obtained by neutralizing the polymer with a basic substance, has good pigment-dispersibility and levelling property, and gives a coated film having superior gloss and smoothness suitable for finishes having excellent esthetic effects. But since the water-dispersible acrylic polymer obtained by the aforesaid method has a high acid value, it gives a coated film having poor water resistance. Another defect is attributed to the fact that this water-dispersible polymer generally has a high viscosity. When it is used to prepare a water-dispersed coating composition having a viscosity adjusted for coating suitability, the resulting composition has a very low solids content and suffers from sagging and popping during the coating and drying operations.

This defect could be removed by increasing the amount of a hydrophilic solvent in the aqueous dispersion medium in the water-dispersed coating composition. For this purpose, however, the hydrophilic solvent must be used in a proportion of at least about 60% by weight based on the aqueous dispersion medium. As a result, the composition extremely decreases in value from the standpoint of pollution control and resource saving which are the principal advantages of using aqueous coating compositions.

It is an object of this invention to provide a water-dispersed coating composition which gives a coated film having superior gloss and smoothness without sagging or popping at the time of coating and drying.

Another object of this invention is to provide a water-dispersed coating composition which gives a coated film having superior durability and water resistance.

Still another object of this invention is to provide a water-dispersed coating composition in which the proportion of water is as high as 60 to 90% by weight based on the aqueous dispersion medium and the amount of a hydrophilic solvent used is small.

Other objects and advantages of this invention will become apparent from the following description.

According to this invention, these objects and advantages are achieved by a water-dispersed coating composition comprising (1) a dispersion of a water-dispersible form of an acrylic graft polymer containing carboxyl groups and hydroxyl and/or amide groups in an aqueous medium containing 60 to 90% by weight of water, said water-dispersible form being obtained by neutralizing at least 50% of the carboxyl groups of said acrylic graft polymer with a basic substance, and said acrylic graft polymer having an acid value of 15 to 40 and a glass transition temperature of $-10°$ C. to 70° C. and being produced by polymerizing (A) an acrylic copolymer containing carboxyl groups, unsaturated groups and optionally hydroxyl and/or amide groups, said acrylic copolymer being obtained by reacting 100 parts by weight of an acrylic polymer having carboxyl groups and optionally hydroxyl and/or amide groups with 0.2 to 3.0 parts by weight of an unsaturated monomer containing a glycidyl group in a hydrophilic organic solvent, and (B) a mixture of an alpha, beta-ethylenically unsaturated carboxylic acid and another copolymerizable unsaturated monomer, said other copolymerizable unsaturated monomer optionally containing a copolymerizable unsaturated monomer having hydroxyl and/or amide groups, said acrylic copolymer (A) and said mixture (B) being selected such that either one of them has hydroxyl and/or amide groups and the difference between the acid value of said acrylic copolymer (A) and that of said mixture (B) is from 25 to 200, and (2) an amino resin.

According to another aspect of this invention, these objects and advantages are achieved by a water-dispersed coating composition comprising a dispersion of a water-dispersible form of a self-curable acrylic graft polymer having carboxyl groups, self-curable amide groups and optionally hydroxyl groups in an aqueous medium containing 60 to 90% by weight of water, said water-dispersible form being obtained by neutralizing at least 50% of the carboxyl groups of said self-curable acrylic graft polymer with a basic substance, said acrylic graft polymer having an acid value of 15 to 40 and a glass transition temperature of $-10°$ C. to 70° C. and being produced by polymerizing (A) an acrylic copolymer having carboxyl groups, unsaturated groups and optionally self-curable amide groups, said acrylic copolymer being obtained by reacting 100 parts by weight of an acrylic polymer having carboxyl groups and optionally self-curable amide groups with 0.2 to 3.0 parts by weight of an unsaturated monomer having a glycidyl group in a hydrophilic organic solvent, and (B) a mixture of an alpha, beta-ethylenically unsaturated carboxylic acid and another copolymerizable unsaturated monomer, said other copolymerizable unsaturated monomer optionally containing a copolymerizable unsaturated monomer having self-curable amide groups, said acrylic copolymer (A) and said mixture (B) being selected such that either one of them has self-curable amide groups and the difference between the acid value of said acrylic copolymer (A) and that of said mixture (B) is from 25 to 200.

The two types of the water-dispersed coating compositions of this invention differ from each other in that a curing component is included in the composition as a separate component (amino resin) from the acrylic graft polymer as a main film-forming component, or is copolymerized (as self-curable amide groups, e.g. N-alkoxymethylolamide groups) in the acrylic graft polymer as a main film-forming component. Commonly, however, they are based on the most basic concept of this invention, i.e. the use of an acrylic graft polymer in which carboxyl groups, hydroxyl groups and/or amide groups are properly distributed in the trunk and graft portions of the polymer and which, therefore, can be dispersed well in an aqueous dispersion medium having a high water content despite its relatively low (15 to 40) acid value.

It has now been found that this most basic concept of this invention can be achieved by producing the acrylic graft polymer used in this invention through the reaction of (A) an acrylic polymer and (B) a monomeric mixture in the manner described hereinabove.

The water-dispersed coating composition of this invention is described in detail below.

1. Aqueous dispersion of an acrylic graft polymer (1)

The aqueous dispersion of an acrylic graft polymer in this invention is a dispersion of an acrylic graft polymer containing carboxyl groups and hydroxyl groups and/or amide groups with at least 50% of its carboxyl groups being neutralized with a basic substance in an aqueous medium containing 60 to 90% of water. The acrylic graft polymer before neutralization of its carboxyl groups with a basic substance has an acid value of 15 to 40 and a glass transition temperature of from $-10°$ C. to 70° C. Preferably, the acrylic graft polymer has an acid value of 15 to 30 and a glass transition temperature of from $-10°$ C. to 50° C. If the acid value of the acrylic graft polymer is smaller than 15, it is impossible to obtain a stable aqueous dispersion of the acrylic graft polymer. On the other hand, when it has an acid value of more than 40, the resulting aqueous dispersion has a high viscosity and gives a coated film having poor water resistance. If the glass transition temperature of the graft polymer is less than $-10°$ C., a coated film prepared from the resulting aqueous dispersion of the graft polymer is too soft. On the other hand, when it exceeds 70° C., only a hard and brittle paint film is obtained which is unsuitable for decorative purposes.

In addition to having the aforesaid properties, the acrylic graft polymer used in this invention is characterized by being produced by the method schematically shown by the following flow chart.

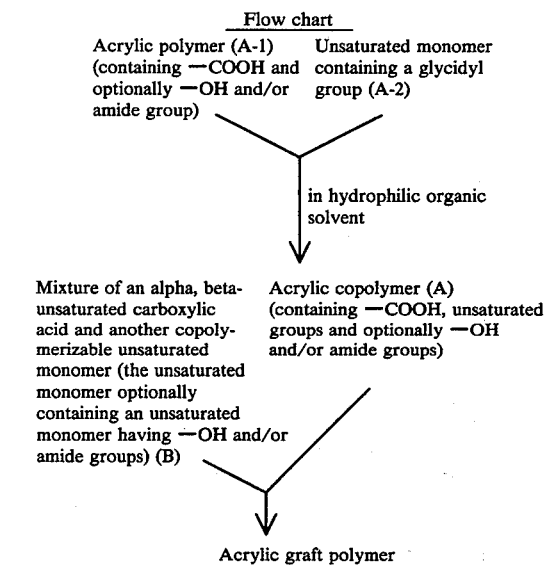

Acrylic copolymer (A)

The acrylic copolymer (A) is produced by reacting 100 parts by weight of an acrylic polymer (A-1) containing carboxyl groups (—COOH) and optionally hydroxyl groups and/or amide groups with 0.2 to 3.0 parts by weight of an unsaturated monomer having a glycidyl group (A-2) in a hydrophilic organic solvent. The reaction is carried out preferably in the presence of a catalyst at a temperature of usually about 0 to about 180° C., preferably about 70 to about 150° C., for a period of about 30 minutes to about 8 hours, preferably about 1 to about 5 hours.

The hydrophilic organic solvent used is preferably a water-miscible hydrophilic organic solvent which can dissolve the resulting acrylic copolymer (A) so as not to cause gellation during the reaction. Those which need not be removed in preparing a water-dispersed coating composition from the resulting acrylic copolymer are suitable. Preferred solvents include, for example, alcohols having 1 to 8 carbon atoms, alkylene glycols having 2 to 3 carbon atoms, mono(—$C_1$–$C_8$ alkyl)ethers or di($C_1$–$C_8$ alkyl) ethers of the alkylene glycols, di(hydroxy–$C_{2-3}$ alkylene) ethers, and mono($C_1$–$C_8$ alkyl ethers)or di($C_1$–$C_8$ alkyl) ethers of the aforesaid dihydroxyalkylene ethers. Specific examples of these solvents are alcohols having 1 to 8 carbon atoms such as methyl alcohol, ethyl alcohol, propyl alcohol, butyl alcohol, amyl alcohol and octyl alcohol; alkylene glycols having 2 or 3 carbon atoms such as ethylene glycol and propylene glycol; mono($C_1$–$C_8$ alkyl) ethers of alkylene glycols having 2 or 3 carbon atoms such as ethylene glycol monomethylethyl-, or butyl-ether, and propylene glycol monomethyl-, ethyl- or butyl-ether; di($C_1$–$C_8$ alkyl) ethers of alkylene glycols having 2 or 3 carbon atoms such as ethylene glycol dimethyl ether and propylene glycol dimethyl ether; di(hydroxy $C_{2-3}$ alkylene) ethers such as diethylene glycol and dipropylene glycol; mono($C_1$–$C_8$ alkyl)ethers of di(hydroxy$C_{2-3}$ alkylene) ethers such as diethylene glycol monomethyl-, ethyl- or butyl- ether and propylene glycol monomethyl-, ethyl- or butyl- ether; and di($C_1$–$C_8$ alkyl)ethers of di(hydroxy-$C_{2-3}$ alkylene)ethers such as diethylene glycol dimethyl ether and dipropylene glycol dimethyl ether.

Examples of catalysts that may be used in the above reaction include quaternary ammonium salts such as tetramethyl ammonium bromide; tertiary alkylamines such as trimethylamine and triethylamine; benzylamines such as dimethylbenzylamine; pyridines; and tertiary alkanolamines such as dimethylethanolamine. The amount of the catalyst used is about 0.01 to about 2.0% by weight based on the total weight of the carboxyl-containing acrylic polymer (A-1) and the glycidyl-containing unsaturated monomer (A-2).

Advantageously, a polymerization inhibitor such as hydroquinone, methoxyphenol, tert-butylcatechol and benzoquinone may be added to the reaction system as required in order to inhibit polymerization of the glycidyl-containing unsaturated monomer and the reaction product (A).

The acrylic polymer (A-1) used in the reaction has a carboxyl group and optionally a hydroxyl and/or amide group. Generally, this acrylic polymer (A-1) is a copolymer of an alpha, beta-ethylenically unsaturated carboxylic acid and another copolymerizable unsaturated carboxylic acid and another copolymerizable unsaturated monomer.

The alpha,beta-ethylenically unsaturated carboxylic acid is preferably one having 3 to 8 more, preferably 3 to 5, carbon atoms and one or two carboxyl groups, especially a compound of the following formula

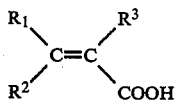

wherein $R^1$ represents a hydrogen atom or a lower alkyl group having 1 to 5 carbon atoms, $R^2$ represents a hydrogen atom, a carboxyl group or a lower alkyl group having 1 to 5 carbon atoms, $R^3$ represents a hydrogen atom, a lower alkoxycarbonyl group having 2 to 6 carbon atoms or a lower alkyl group having 1 to 5 carbon atoms.

The lower alkyl group for $R^1$, $R^2$ and $R^3$ or the lower alkyl group in the lower alkoxycarbonyl group represented by $R^3$ is an alkyl group having 1 to 5 carbon atoms, preferably 1 to 4 carbon atoms, such as methyl, ethyl, propyl, butyl or pentyl, the methyl group being especially preferred.

Examples of the alpha,beta-ethylenically unsaturated carboxylic acid are acrylic acid, methacrylic acid, crontonic acid, itaconic acid, maleic acid, maleic anhydride, and fumaric acid. These carboxylic acids can be used either singly or as a combination of two or more.

Preferred other unsaturated monomers that can be copolymerized with the aforesaid alpha,beta-ethylenically unsaturated carboxylic acids are acrylic or methacrylic acid esters, acrylic or methacrylic acid amides, vinyl aromatic compounds and other ethylenic monomers. Specific examples of these monomers include the following.

(a) Acrylic or methacrylic esters $C_1$–$C_{18}$ alkyl esters of acrylic or methacrylic acid such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate and lauryl methacrylate; alkoxyalkyl esters of acrylic or methacrylic acid such as methoxybutyl acrylate, methoxybutyl methacrylate, methoxyethyl acrylate, methoxyethyl methacrylate, ethoxybutyl acrylate and ethoxybutyl methacrylate; alkenyl esters of acrylic or methacrylic acid such as allyl acrylate and allyl methacrylate; $C_2$–$C_8$ hydroxyalkyl esters of acrylic or methacrylic acid such as hydroxyethyl acrylate, hydroxyethyl methacrylate, hydroxypropyl acrylate and hydroxypropyl methacrylate; mono- or di-alkylaminoalkyl esters of acrylic or methacrylic acid such as diethylaminoethyl acrylate, diethylaminoethyl methacrylate, methylaminoethyl acrylate and methylaminoethyl methacrylate; and alkenyloxyalkyl esters of acrylic or methacrylic acid such as allyloxyethyl acrylate and allyloxymethacrylate.

(b) Acrylic or methacrylic acid amides

N-methylol acrylamide, N-methylol methacrylamide, N-alkoxymethylol acrylamide (e.g., N-isobutoxymethylol acrylamide) and N-alkoxymethylol methacrylamide (e.g., N-isobutoxymethylol methacrylamide).

(c) Vinyl aromatic compounds

Styrene, alpha-methylstyrene, vinyltoluene, p-chlorostyrene, and vinylpyridine.

(d) Other monomers

Acrylonitrile, methacrylonitrile and methylisopropenyl ketone.

These copolymerizable unsaturated monomers may be used singly or in combination with one another.

The acrylic polymer (A-1) used in this invention can be easily prepared by copolymerizing the alpha,beta-ethylenically unsaturated carboxylic acid and the other copolymerizable unsaturated monomer in the presence of a catalyst by a method known per se.

When the polymerization is carried out using a hydroxyl-containing monomer such as a $C_2$–$C_8$ hydroxyalkyl ester of acrylic or methacrylic acid or a monomer containing such a hydroxyl-containing monomer as the other copolymerizable unsaturated monomer, an acrylic copolymer containing a hydroxyl group as well as a carboxyl group can be obtained. On the other hand, an acrylic copolymer having an amide group as well as the carboxyl group is obtained when the other copolymerizable unsaturated monomer used in the polymerization is a monomer having an amide group such as an acrylic or methacrylic acid amide or a monomer containing amido-containing monomer. Likewise, an acrylic copolymer having a hydroxyl group and an amide group as well as the carboxyl group can be obtained when a hydroxyl-containing monomer and an amido-containing monomer are used together as the other copolymerizable unsaturated monomer.

The unsaturated monomer (A-2) containing a glycidyl group which is used in the reaction preferably has one glycidyl group and one ethylenically unsaturated bond in the molecule. For example, glycidyl acrylate, glycidyl methacrylate and allyl glycidyl ether are preferably used.

The reaction between the acrylic polymer (A-1) and the glycidyl-containing unsaturated monomer (A-2) is carried out in the presence of the hydrophilic organic solvent exemplified hereinabove, preferably in the presence of the catalyst exemplified hereinabove.

In performing the reaction, 100 parts by weight of the acrylic polymer (A-1) and 0.2 to 3.0 parts by weight of the glycidyl-containing unsaturated monomer (A-2) are used. If the amount of the glycidyl-containing unsaturated monomer is less than the lower limit, graft copolymerization of the monomeric mixture (B) with the resulting reaction product does not proceed sufficiently, and a stable aqueous dispersion of the acrylic graft polymer cannot be obtained. If the amount of the glycidyl-containing unsaturated monomer is larger than the upper limit, gellation occurs during the graft copolymerization.

Mixture (B) of an alpha,beta-ethylenically unsaturated carboxylic acid and another copolymerizable unsaturated monomer The mixture (B) is a component to be graft copolymerized with the acrylic copolymer (A), and consists of an alpha,beta-ethylenically unsaturated carboxylic acid and another copolymerizable unsaturated monomer.

The alpha-beta-ethylenically unsaturated carboxylic acid is an unsaturated aliphatic mono- or poly-carboxylic acid of the type having an addition-polymerizable double bond between the carbon atom to which the carboxyl group is bonded and an adjacent carbon atom. It comprises 3 to 8 carbon atoms, preferably 3 to 5 carbon atoms, and has 1 or 2 carboxyl groups. Examples of preferred alpha,beta-ethylenically unsaturated carboxylic acids are the same as those exemplified hereinabove with regard to the production of the acrylic copolymer (A).

The other copolymerizable unsaturated monomer preferably includes, for example, acrylic or methacrylic acid esters, acrylic or methacrylic acid amides, vinyl aromatic compounds and other ethylenically unsaturated monomers. Specific examples of these monomers are the same as described hereinabove with regard to the production of the acrylic copolymer (A).

The mixture (B) used in this invention is a mixture of at least one alpha,beta-ethylenically unsaturated carboxylic acid and at least one other copolymerizable unsaturated monomer. The types, quantitative relation and combination of the alpha,beta-ethylenically unsaturated carboxylic acid and other copolymerizable unsaturated monomer can be selected according to the desired properties of the acrylic graft polymer obtained. For example, when a hydroxyl-containing monomer such as a $C_2$–$C_8$ hydroxyalkyl ester of acrylic or methacrylic acid is used as the other copolymerizable unsaturated monomer, the resulting mixture (B) contains a hydroxyl group as well as the carboxyl group. When an amido-containing monomer such as an acrylic or methacrylic acid amide is used as the other copolymerizable unsaturated monomer, the resulting mixture (B) has an amide group as well as the carboxyl group. A mixture (B) containing a hydroxyl group and an amide group as well as the carboxyl group is likewise obtained when a hydroxyl-containing monomer and an amido-containing monomer are used together.

Polymerization of the acrylic copolymer (A) and the mixture (B)

In accordance with this invention, the acrylic graft polymer used in this invention is produced by graft-copolymerizing the acrylic copolymer (A) with the mixture (B).

The polymerization is carried out at a temperature of about 60° to about 150° C., preferably about 70° to about 130° C., preferably in the presence of a catalyst, by, for example, a known solution-polymerization method. In performing the solution polymerization, a hydrophilic organic solvent is preferably used. Especially preferred solvents are those which need not be removed from the resulting polymerization product in preparing a water-dispersed coating composition. Examples include alcohols having 1 to 8 carbon atoms, alkylene glycols having 2 to 3 carbon atoms, mono($C_1$–$C_8$ alkyl)ethers of the alkylene glycols, di($C_1$–$C_8$ alkyl) ethers of the alkylene glycols, di(hydroxy-$C_{2-3}$ alkylene) ethers, mono($C_1$–$C_8$ alkyl) ethers of the dihydroxyalkylene ethers, and di($C_1$–$C_8$ alkyl) ethers of the dihydroxyalkylene ethers. Specific examples of these solvents are the same as those given hereinabove with regard to the production of the acrylic copolymer (A).

In the present invention, the solvent used in the polymerization for forming the acrylic copolymer (A) may, or may not, be the same as the solvent used in the polymerization of the acrylic copolymer (A) and the mixture (B).

Preferred catalysts used in the polymerization of the components (A) and (B) are radical initiators which can be used in ordinary radical polymerization, such as azo compounds, peroxide compounds, sulfides, sulfines, sulfinic acids, diazo compounds, nitroso compounds, redox systems, and ionizing radiation. These polymerization catalysts are known per se.

In the present invention, this polymerization reaction is carried out by using the components (A) and (B) which are selected such that (1) either one of them has a hydroxyl and/or an amide group, and (2) the difference between the acid value of component (A) and that of the component (B) is from 25 to 200.

When only the component (A) contains a hydroxyl group and/or an amide group, the above polymerization reaction gives an acrylic graft polymer in which a shoot free from these groups is grafted to a trunk of the acrylic copolymer (A) containing a hydroxyl group and/or an amide group. Likewise, when only the component (B) contains these groups, there is obtained an acrylic graft polymer in which a shoot having a hydroxyl group and/or an amide group is grafted to a trunk of the acrylic copolymer (A) free from these groups. An acrylic graft polymer containing a hydroxyl group and/or an amide group both at the trunk and the shoot is obtained when both the components (A) and (B) contain these groups.

The acrylic graft polymer used in this invention should have a hydroxyl group and/or an amide group. These groups are required for a curing reaction of converting the coating composition of this invention into a coated film. Any of the above-mentioned embodiments is included within the present invention. In such embodiments of this invention, the other copolymerizable unsaturated monomer having a hydroxyl group and/or an amide group is included in the acrylic copolymer (A) and/or the mixture (B) so that the proportion of units derived from the copolymerizable unsaturated monomer in the resulting acrylic graft polymer is 5 to 30% by weight, especially 10 to 30% by weight.

Investigations of the present inventors have shown that the curability of the coating composition of this invention to a paint film is further improved by including in the acrylic graft polymer units derived from 2-acrylamide-2-methylpropanesulfonic acid, a monophosphoric acid ester of a hydroxyalkyl acrylate or methacrylate, etc. Such a monomer can be included in a proportion of not more than 5% by weight. Alone, this monomer is not suitable for use as the other copolymerizable unsaturated monomer, but is understood to be within the category of the other unsaturated monomer.

The acrylic copolymer (A) and the monomeric mixture (B) are also selected such that the difference between the acid values of the components (A) and (B) is from 25 to 200, preferably from 30 to 200. If the difference in acid value is less than 25, the resulting acrylic graft polymer does not give a coating composition in an aqueous medium composed mainly of water, which has good dispersibility and stability. On the other hand, if the difference in acid value exceeds 200, the resulting acrylic graft polymer shows very high hydrophilicity and therefore, gives only a coating composition having a high viscosity and poor water resistance.

The aforesaid conditions can be easily predetermined by selecting suitable acid values and amounts of the two components (A) and (B).

Preferably, the aforesaid polymerization reaction in accordance with this invention is carried out by using an acrylic copolymer (A) having an acid value of 40 to 200 and a mixture (B) having an acid value of not more than 30, preferably not more than 25, or by using an acrylic copolymer (A) having an acid value of not more than 30 and a mixture (B) having an acid value of 40 to 200.

The preferred weight ratio of the acrylic copolymer (A) to the mixture (B) in the former case is from 5:95 to 60:40, and the preferred weight ratio of the acrylic copolymer (A) to the mixture (B) in the latter case is from 95:5 to 40:60.

Thus, according to the above polymerization reaction, an acrylic graft polymer having an acid value of from 15 to 40 and a glass transition temperature of from −10° C. to 70° C., advantageously an acid valeu of from 15 to 30 and a glass transition temperature of from −10° C. to 50° C., can be obtained.

The acrylic graft polymer may be used in various molecular weights depending upon the intended use. Usually, it is advantageously used in a number average molecular weight of about 500 to about 100000. Adjustment of the molecular weight is effected by using a chain transfer agent such as mercaptan and carbon tetrachloride in the graft copolymerization reaction system, or by properly selecting the type and amount of the polymerization catalyst, the polymerization temperature, the type and amount of the organic solvent, etc.

The resulting acrylic graft polymer is dispersed in water either as such or after the solvent is distilled off from it. Specifically, the polymer is treated with a known basic substance to neutralize at least 50% of the carboxyl groups therein and to render it water-dispersible, and then dispersing the treated polymer in an aqueous dispersing medium containing 60 to 90% by weight of water. The basic substance includes, for example, ammonia, amines, and alkali metal hydroxides.

The amines include primary, secondary and tertiary alkylamines, alkanolamines and cycloalkylamines. Specific examples are alkylamines such as monoethylamine, diethylamine, triethylamine, diisopropylamine, trimethylamine and diisobutylamine; alkanolamines such as monoethanolamine, diethanolamine and triethanolamine; and cycloalkylamines such as cyclohexylamine. Potassium hydroxide and sodium hydroxide are cited as examples of the alkali metal hydroxide.

The aqueous dispersing medium is a mixture of water and a hydrophilic solvent, and the proportion of water is 60 to 90% by weight based on the entire medium. The same hydrophilic solvents as exemplified hereinabove with regard to the acrylic copolymer (A) can be used to prepare the aqueous dispersing medium.

The resulting acrylic graft polymer in the form of an aqueous dispersion has carboxylate groups resulting from neutralization of at least 50% of its carboxyl groups with a basic substance, and a hydroxyl group and/or an amide group, and forms a main film-forming component in the water-dispersed coating composition of this invention.

2. Amino resin (2)

Examples of the amino resin used as a crosslinking agent in the wter-dispersed coating composition of this invention are known melamine/formaldehyde resin, its derivatives, urea/formaldehyde resin, guanamine/formaldehyde resin, benzoguanamine/formaldehyde resin, and acetoguanamine/formaldehyde resin. These amino resins are required when the acrylic graft polymer has no self-curability. If the acrylic graft polymer has self-curability, these amino resins are not necessary.

In other words, when the acrylic graft polymer in this invention contains units derived from a monomer having a self-curable amide group, such as an N-alkoxymethylol acrylamide or N-alkoxymethylol methacrylamide, the graft polymer has the property of curing in the absence of such an amino resin, and therefore, it is not necessary to use such an amino resin.

Water-dispersed coating composition of this invention

The water-dispersed coating composition of this invention comprises as a main ingredient the aqueous dispersion (1) of the acrylic graft polymer and optionally the amino resin (2). The weight ratio of the component (1) to the component (2), as resin solids, is generally from 95:5 to 65:35, preferably from 90:10 to 65:35. The mixing of the above two components can be effected by a method known per se. For example, the component (2) is added to the aqueous dispersion (1), and the mixture is stirred.

As required, various inorganic and organic pigments are added to the water-dispersed coating composition. This may be achieved by any method, for example by directly adding a pigment to the aqueous dispersion of the acrylic graft polymer and dispersing it by a dispersing machine such as a pebble mill, a steel ball mill, a sand mill, an attriter or a roll mill; by adding a pigment to an organic solvent solution of the acrylic graft polymer before neutralization, and dispersing it by the aforesaid dispersing machine; or by adding a pigment to a solution of the amino resin and dispersing it by the dispersing machine.

If desired, it is also possible to incorporate an additive such as an acid catalyst, defoamer, surface controlling agent or ultraviolet absorber. Or the properties of coated films from the coating composition of this invention may be improved further by adding cellulose derivatives, epoxy resins, various vinyl resins, various acrylic resins, etc. in amounts which do not impair the essence of this invention.

The water-dispersed coating composition of this invention described hereinabove is very useful as an industrial paint because of various advantages among which are included the following.

(1) Because the main components are water-dispersible, a coating composition having a low viscosity and a high solids content can be obtained. Thus, the coating composition does not suffer from the defect of "sagging" or "popping", and lends itself to easy coating operation.

(2) The coating composition has good pigment-dispersibility and good levelling property.

(3) The coating composition has better film properties (e.g., water resistance) than coating compositions composed mainly of a water-soluble polymer or an emulsified polymer.

(4) The volatile component of the coating composition is composed mainly of water, and the amount of solvent released into the atmosphere is small. Hence, the coating composition does not induce air pollution.

The following Examples illustrate the present invention more specifically. All parts and percentages in these examples are by weight unless otherwise specified.

EXAMPLE 1

A reactor was charged with 100 parts of diethylene glycol monobutyl ether, and with stirring, it was heated to 100° C. The following ingredients were added dropwise to the reactor at 100° C. over 2 hours.

| | |
|---|---|
| Styrene | 24 parts |
| n-Butyl methacrylate | 28.3 parts |
| 2-Ethylhexyl acrylate | 30 parts |
| 2-Hydroxyethyl methacrylate | 15 parts |
| Acrylic acid | 2 parts |
| Azobisisobutyronitrile | 3 parts |

The mixture was reacted further at the same temperature for 3 hours (this step is referred to hereinbelow as "step 1").

The following ingredients were added to the solution resulting from the above reaction.

| | |
|---|---|
| Hydroquinone | 0.1 part |
| Glycidyl methacrylate | 0.7 part |
| Tetraethyl ammonium bromide | 0.2 part |

The mixture was reacted at 100° C. for 3 hours (this step is referred to hereinbelow as "step 2"). Thus, a clear solution of an acrylic copolymer having an acid value of 15.6 was obtained.

One hundred (100) parts of the acrylic copolymer solution was heated to 120° C., and a mixture (acid value 42.1) of the following ingredients was added dropwise over 2 hours.

| | |
|---|---|
| Styrene | 8.3 parts |
| n-Butyl acrylate | 29 parts |
| 2-Hydroxypropyl methacrylate | 10 parts |
| Acrylic acid | 2.7 parts |
| Azobisisobutyronitrile | 1 part |

The mixture was maintained at 120° C. for 1 hour, and a solution of 0.5 part of azobisisovaleronitrile in 5 parts of diethylene glycol monobutyl ether was added dropwise over 1 hour, and the mixture was further reacted at 120° C. for 3 hours (this step is referred to hereinbelow as "step 3"). The resulting reaction product was cooled to 70° C., and 5.1 parts (1.0 equivalent based on the carboxyl groups of the reaction product) of triethylamine was added to neutralize the product, followed by addition of 126 parts of water to form an aqueous dispersion (this step is referred to hereinbelow as "step 4").

The resulting aqueous dispersion was an aqueous dispersion of an acrylic graft polymer which had a solids content of 35% and a viscosity of 170 centipoises and was opalescent. The acrylic graft polymer had an acid value of 28.4 and a glass transition temperature of 1.8° C. The water content in the volatile component (dispersing medium) in the aqueous dispersion was 68%.

When the aqueous dispersion was stored at 50° C. for one month, no flocculation nor sedimentation occurred, and the dispersion remained very stable.

EXAMPLES 2 to 5

Aqueous dispersions were prepared in the same way as in Example 1 using the formulations and reaction conditions shown in steps 1 to 4 in Table 1.

TABLE 1

| | | Example | 2 | 3 | 4 | 5 |
|---|---|---|---|---|---|---|
| Step 1 | Solvent | Dipropylene glycol monoethyl ether | 100 | — | — | — |
| | | Ethylene glycol monomethyl ether | — | — | 30 | — |
| | | Ethylene glycol monobutyl ether | — | 40 | — | — |
| | | n-Butanol | — | — | 30 | — |
| | | Propylene glycol monomethyl ether | — | — | — | 55 |
| | | Propylene glycol monoethyl ether | — | 20 | — | — |
| | Monomer | Styrene | — | 30 | 27.5 | — |
| | | Vinyltoluene | 23.8 | — | — | — |
| | | Ethyl acrylate | — | — | — | 45 |
| | | Ethyl methacrylate | — | — | — | 22 |
| | | Methyl methacrylate | — | — | — | 15 |
| | | n-Butyl acrylate | — | — | 51 | — |
| | | n-Butyl methacrylate | 50 | — | — | — |
| | | 2-Ethylhexyl methacrylate | — | 48.1 | — | — |

TABLE 1-continued

| | | Example | 2 | 3 | 4 | 5 |
|---|---|---|---|---|---|---|
| | | Hydroxypropyl methacrylate | — | 15 | 18 | — |
| | | N-butoxymethylol acrylamide | 25 | — | — | — |
| | | Acrylic acid | — | 4.1 | — | 2 |
| | | Methacrylic acid | 0.5 | — | 2.8 | — |
| | Catalyst | Azobisisobutyronitrile | 2 | — | — | — |
| | | Benzoyl peroxide | — | — | — | 2 |
| | | t-Butyl peroxybenzoate | — | 0.7 | — | — |
| | | t-Butyl peroxyoctoate | — | — | 1.0 | — |
| | | Reaction temperature (°C.) | 100 | 120 | under reflux | 100* |
| Step 2 | Monomer | Hydroquinone | — | 0.2 | 0.1 | — |
| | | Monomethoxyhydroquinone | 0.1 | — | — | — |
| | | Tetraethyl ammonium bromide | 0.2 | — | — | — |
| | | Tetraethyl ammonium chloride | — | 0.2 | — | — |
| | | Triethylamine | — | — | 0.1 | — |
| | | Glycidyl methacrylate | 0.7 | 2.8 | 0.7 | 1.0 |
| | | Reaction temperature (°C.) | 100 | 120 | under reflux | 100 |
| | | Polymer solution obtained in step 2 | 120 | 136 | 104 | 124 |
| Step 3 | Monomer | Styrene | — | 8.5 | 10 | 9 |
| | | n-Butyl acrylate | 12.5 | — | 16.3 | — |
| | | 2-Ethylhexyl methacrylate | — | — | — | 3.5 |
| | | Methyl methacrylate | 10 | — | — | — |
| | | Lauryl methacrylate | 10 | — | — | — |
| | | Hydroxyethyl acrylate | 5 | — | — | 5 |
| | | Hydroxyethyl methacrylate | — | 5 | — | — |
| | | Hydroxypropyl methacrylate | — | — | 5 | — |
| | | Acrylic acid | 2.5 | 1.5 | 3.7 | 2.5 |
| | Catalyst | Azobisisobutyronitrile (the parenthesized figure shows the amount additionally fed; the same applies to the other catalysts) | 1.0 (1.0) | — | — | — |
| | | Benzoyl peroxide | — | — | — | 0.4 (0.3) |
| | | t-Butyl peroxybenzoate | — | 0.3 (0.3) | — | — |
| | | t-Butyl peroxyoctoate | — | — | 0.7 (0.5) | — |
| | | Reaction temperature (°C.) | 100 | 120 | under reflux | 100 |
| Step 4 | Neutralizing agent | Dimethylaminoethanol (the parenthesized figure represents an equivalent weight required for neutralization; the same applies hereinbelow) | 3.09 (1.00) | — | — | 3.64 (0.80) |
| | | N-methylmorpholine | — | 3.60 (0.70) | — | — |
| | | Triethylamine | — | — | 4.18 (0.60) | — |
| | | Water | 118 | 126 | 138 | 133 |
| Acid value of the monomeric mixture in step 3 | | | 48.7 | 77.9 | 82.4 | 97.4 |
| Acid value of the polymer obtained in step 2 | | | 0 | 19.9 | 15.3 | 11.5 |
| Acid value of the acrylic graft polymer | | | 19.5 | 28.6 | 38.7 | 28.7 |
| Glass transition temperature (°C.) of the acrylic graft polymer | | | 30.0 | 33.9 | −7.1 | 18.1 |
| Viscosity of the aqueous dispersion (centipoises at 25° C.) | | | 70 | 75 | 123 | 93 |
| Solids content (%) of the aqueous dispersion | | | 35 | 35 | 35 | 35 |
| Water content (%) of the volatile component in the aqueous dispersion | | | 63.5 | 67.8 | 74.3 | 71.6 |
| State of the aqueous dispersion | | | opalescent non-clear liquid | scent non-clear liquid | scent non-clear liquid | scent non-clear liquid |
| Stability of the aqueous dispersion (at 50° C. for 1 month) | | | stable | stable | stable | stable |

*The additional catalyst used in step 3 was used as a solution in 5 parts of the same solvent as used in step 1.

EXAMPLE 6

A mixture of the following ingredients was added dropwise over 2 hours to 100 parts of stirred isopropanol under reflux.

| | |
|---|---|
| Styrene | 25 parts |
| n-Butyl methacrylate | 30 parts |
| Ethyl methacrylate | 18.9 parts |
| Acrylic acid | 0.4 part |
| Hydroxypropyl methacrylate | 15 parts |
| n-Octylmercaptan | 0.5 part |
| Benzoyl peroxide | 1.5 parts |

The mixture was further heated for 3 hours, and then a mixture of the following ingredients was added and the resulting mixture was reacted under heat for 8 hours.

| | |
|---|---|
| Hydroquinone | 0.1 part |
| Glycidyl methacrylate | 0.7 part |
| Triethylamine | 0.1 part |

Thus, an acrylic copolymer solution having an acid value of 0.3 was obtained. While the resulting solution was being heated under reflux, a mixture (acid value 194.8) of the following ingredients was added dropwise over 2 hours.

| | |
|---|---|
| Styrene | 2 parts |
| n-Butyl acrylate | 4 parts |
| Acrylic acid | 2.5 parts |
| Hydroxymethyl acrylate | 1.5 parts |
| Benzoyl peroxide | 0.5 part |

The mixture was further heated for 1 hour, and a solution of 0.5 part of benzoyl peroxide in 10 parts of isopropanol was added dropwise over 1 hour, and the mixture was further heated for 3 hours. The resulting acrylic graft polymer had an acid value of 19.7 and a glass transition temperature of 42.9° C.

Then, 3.12 parts (corresponding to 1.0 equivalent to the carboxyl groups) of dimethylaminoethanol was added to the resulting graft polymer. The mixture was stirred, and then 127 parts of water was added. The mixture was stirred until a uniform solution was obtained. From the solution was removed 90 parts of isopropanol by distillation under reduced pressure. The resulting solution was an opalescent aqueous dispersion of acrylic graft polymer having a solids content of 40% and a viscosity of 25 centipoises at 25° C. The water content of the volatile component of the aqueous dispersion was 84.6%. The aqueous dispersion remained stable on storage for 1 month at 50° C.

COMPARATIVE EXAMPLE 1

With stirring, a mixture of the following ingredients was added dropwise over 2 hours to a mixture of 17.5 parts of ethylene glycol monoethyl ether and 17.5 parts of n-butyl alcohol.

| | |
|---|---|
| Styrene | 28.5 parts |
| n-Butyl methacrylate | 15.6 parts |
| n-Butyl acrylate | 33.5 parts |
| Hydroxypropyl methacrylate | 17.2 parts |
| Acrylic acid | 3.71 parts |
| Methacrylic acid | 1.50 parts |
| Azobisisobutyronitrile | 4.2 parts |

The mixture was further heated for 1 hour, and then a solution of 0.5 part of azobisisovaleronitrile in 5 parts of ethylene glycol monomethyl ether was added dropwise over 1 hour. The mixture was further heated for 3 hours. The resulting acrylic copolymer had an acid value of 38.7 and a glass transition temperature of 8.2° C. The acrylic copolymer solution was cooled to 70° C., and 8 parts (corresponding to 1 equivalent to the carboxyl group) of N-ethylmorpholine was added. The mixture was stirred, and 138 parts of water was added. The mixture was stirred until a uniform solution was obtained. The resulting solution was a highly viscous semi-transparent liquid having a solids content of 35% and a viscosity of 63000 centipoises.

The resulting solution was diluted with water to substantially the same viscosity as the aqueous dispersion obtained in Example 4 to obtain a clear liquid having a solids content of 23%. When this liquid was stored at 50° C. for 10 days, a white precipitate formed.

When the above acrylic copolymer solution was neutralized with 4.8 parts (corresponding to 0.6 equivalent to the carboxyl group) of N-ethylmorpholine, and then water was added, a uniform aqueous dispersion could not be obtained.

COMPARATIVE EXAMPLE 2

A mixture composed of 50 parts of n-butanol and 50 parts of ethylene glycol monomethyl ether was additionally supplied to the acrylic copolymer solution obtained in Comparative Example 2 to adjust its solids content to 35% and its viscosity to 120 centipoises. The water content of the volatile component of the resulting solution was 30%.

COMPARATIVE EXAMPLE 3

The procedure of Example 5 was repeated except that the step of adding glycidyl methacrylate (step 2) was omitted. An opalescent liquid having a solids content of 35% and a viscosity of 36 centipoises was obtained. When the resulting liquid was stored at 50° C., a white precipitate formed at the end of 10 days.

COMPARATIVE EXAMPLE 4

A mixture of the following ingredients was added dropwise over 2 hours to 100 parts of stirred methyl carbitol heated at 120° C.

| | |
|---|---|
| Styrene | 20 parts |
| n-Butyl methacrylate | 44.9 parts |
| Lauryl methacrylate | 20 parts |
| Hydroxyethyl acrylate | 10 parts |
| Acrylic acid | 4.5 parts |
| t-Butyl peroxybenzoate | 2 parts |

The mixture was further heated for 3 hours. Then a mixture of the following ingredients was added, and the mixture was heated for 3 hours.

| | |
|---|---|
| Hydroquinone | 0.1 part |
| Glycidyl acrylate | 0.7 part |
| Tetraethyl ammonium bromide | 0.2 part |

The resulting acrylic copolymer had an acid value of 32, then, 80 parts of the acrylic copolymer solution was heated to 120° C., and a mixture of the following ingredients was added dropwise over 2 hours. The mixture was further heated for 1 hour.

| Styrene | 10 parts |
|---|---|
| n-Butyl methacrylate | 40 parts |
| N-butoxymethyl acrylamide | 10 parts |
| t-Butyl peroxybenzoate | 1.2 parts |

Then, a solution of 0.5 part of t-butyl peroxybenzoate in 10 parts of methyl carbitol was added dropwise over 1 hour, and the mixture was further heated for 3 hours. The resulting acrylic graft polymer had an acid value of 13.0. The acrylic graft polymer solution was cooled to 70° C., and neutralized with 2.06 parts (corresponding to 1.0 equivalent to the carboxyl group) of dimethylethanolamine. Water (134 parts) was added, and the mixture was stirred until a uniform solution was obtained. The solution was a white liquid having a solids content of 35% and a viscosity of 70 centipoises. When it was stored at 50° C. for 10 days, a precipitate formed.

COMPARATIVE EXAMPLE 5

A mixture of the following ingredients was added dropwise over 2 hours to 100 parts of stirred methyl Cellosolve under reflux, and the mixture was further heated for 3 hours.

| Styrene | 30 parts |
|---|---|
| n-Butyl acrylate | 43.7 parts |
| Hydroxyethyl acrylate | 15 parts |
| Acrylic acid | 10.6 parts |
| Azobisisobutyronitrile | 2 parts |

Then, a mixture of the following ingredients was added, and the mixture was heated for 3 hours. the resulting acrylic copolymer had an acid value of 80.

| Hydroquinone | 0.1 part |
|---|---|
| Glycidyl methacrylate | 0.7 part |
| Tetraethyl ammonium bromide | 0.2 part |

One hundred (100) parts of the acrylic copolymer solution was heated under reflux, and a mixture of the following ingredients was added dropwise over 2 hours. The mixture was further heated for 1 hour.

| Styrene | 15 parts |
|---|---|
| n-Butyl methacrylate | 24 parts |
| Hydroxypropyl methacrylate | 8 parts |
| Methacrylic acid | 3.0 parts |
| t-Butyl peroxybenzoate | 1 part |

Then, a solution of 0.5 part of t-butyl peroxybenzoate in 5 parts of methyl Cellosolve was added dropwise over 1 hour, and the mixture was heated further for 3 hours.

The acrylic graft polymer in the resulting solution had an acid value of 58.7. The acrylic graft polymer solution was cooled to 70° C., and neutralized with 6.3 parts (corresponding to 0.6 equivalent to the carboxyl group) of triethylamine. Water (124 parts) was added, and the mixture was stirred until a uniform solution was obtained. The resulting solution was a semi-transparent highly viscous liquid having a solids content of 35% and a viscosity of 18000 centipoises. When it was stored at 50° C. for 10 days, it became pudding-like.

COMPARATIVE EXAMPLE 6

The acrylic graft polymer having an acid value of 58.7 obtained in Comparative Example 5 was neutralized with 10.5 parts (corresponding to 1.0 equivalent to the carboxyl group), and water was added to adjust its water content to 35%. The product was a clear highly viscous liquid having a viscosity of 75000. When it was stored at 50° C. for 10 days, its viscosity further increased remarkably.

COMPARATIVE EXAMPLE 7

A reactor was charged with 770 parts of water, 1.9 parts of ammonium persulfate and 22 parts of Triton X-200 (an anionic surfactant made by Rohm & Haas Co.), and they were heated to 95° C. To the heated mixture was added dropwise over 3 hours a mixture of the following ingredients.

| Styrene | 360 parts |
|---|---|
| n-Butyl methacrylate | 600 parts |
| Hydroxypropyl methacrylate | 216 parts |
| Acrylic acid | 24 parts |
| Ammonium persulfate | 5 parts |
| Triton X-200 | 22 parts |
| Triton X-305 (A nonionic surfactant made by Rohm & Haas Co.) | 52 parts |
| Water | 648 parts |

During the addition, the contents of the reactor were maintained at 95° C. The reaction product was cooled to 35° C., and 6 parts of dimethylethanolamine and 49 parts of water were added. The resulting product was a milk-like white dispersion having a solids content of 44 to 45% and a viscosity of 50 centipoises.

EXAMPLE 7

Water-dispersed coating compositions of this invention were prepared from the aqueous dispersions obtained in Examples 1 to 6 in accordance with the formulations shown in Table 2 (parts by weight). The resulting coating compositions were diluted with water to a viscosity (Ford Cup #4 at 25° C.) of 40 seconds.

Each of the resulting coating compositions was spray-coated on a zinc phosphate-treated steel plate and baked at 160° C. for 20 minutes.

The resulting cured films were tested for the properties shown in Table 4.

TABLE 2

| Coating composition No. | 1 | 2 | 3 | 4 | 5 | 6 |
|---|---|---|---|---|---|---|
| Aqueous dispersion obtained in Example No. | 1 | 2 | 3 | 4 | 5 | 6 |
| Amount as solids of the aqueous dispersion | 70 | 100 | 85 | 70 | 70 | 65 |
| Amino resin | | | | | | |
| Cymel 300 | — | — | — | — | — | 35 |
| Cymel 303 | 30 | — | — | — | — | — |
| Cymel 370 | — | — | — | 30 | — | — |
| Sumimal M66B | — | — | 15 | — | — | — |

TABLE 2-continued

| Coating composition No. | 1 | 2 | 3 | 4 | 5 | 6 |
|---|---|---|---|---|---|---|
| Yuban XU-120 | — | — | — | — | 30 | — |
| Rutile titanium white | 100 | 100 | 100 | 100 | 100 | 100 |
| p-Toluenesulfonic acid | 1 | — | — | — | — | — |
| Ethylene glycol monoethyl ether | 10 | 5 | 10 | — | 10 | — |
| Solids content (%) | 56 | 50 | 52 | 57 | 54 | 62 |
| Water content in the volatile component (%) | 67 | 63.6 | 67.1 | 71.2 | 72.5 | 79.6 |
| Stability of the coating composition on storage at 50° C. for 1 month | Stable | Stable | Stable | Stable | Stable | Stable |

Note to Table 2
Cymel 300, 303 and 370: melamine resins made by American Cyanamid Co.; Suminal M66B: a melamine resin made by Sumitomo Chemical Co., Ltd.; Yuban XU-120: a melamine resin made by Mitsui Toatsu Chemicals, Inc.

COMPARATIVE EXAMPLE 8

Coating compositions were prepared from the aqueous solutions or dispersions obtained in Comparative Examples 1 to 7 in accordance with the formulations shown in Table 3 (parts by weight), and diluent with water to a viscosity (Ford cup #4 at 25° C.) of 40 seconds.

Each of the resulting coating compositions was coated and tested for the film properties in the same way as in Example 7. The results are shown in Table 4.

TABLE 3

| Coating composition No. | 7 | 8 | 9 | 10 | 11 | 12 | 13 | 14 |
|---|---|---|---|---|---|---|---|---|
| Aqueous solution or dispersion obtained in Comparative Example No. | 1 | 2 | 3 | 4 | 5 | 6 | 7 | 1 |
| Amount of the aqueous solution or dispersion used (as solids) | 70 | 70 | 70 | 70 | 70 | 70 | 70 | 70 |
| Cymel 303 | 30 | 30 | 30 | 30 | 30 | 30 | 30 | 30 |
| Rutile titanium white | 100 | 100 | 100 | 100 | 100 | 100 | 100 | 100 |
| Ethylene glycol monoethyl ether | 100 | 35 | 10 | 10 | 100 | 100 | — | 50 |
| Water content (%) in the volatile component | 44.5 | 37 | 67.6 | 69.3 | 41.3 | 53.9 | 98 | 80 |
| Stability of the coating composition (stored at 50° C.) | Separated into two layers in 10 days | Separated into two layers in 20 days | Separated into two layers in 10 days | Separated into two layers in 10 days | Became pudding like in 20 days | Became pudding like in 25 days | Stable for 1 month | Separated into two layers in 10 days |

TABLE 4

| Coating composition No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Film thickness (microns) critical for popping | 35 | 35 | 40 | 35 | 40 | 35 | 35 | 35 | 35 | 25 | 35 | 25 | 40 | 18 |
| Film thickness (microns) critical for sagging | 45 | 40 | 45 | 50 | 45 | 50 | 35 | 37.5 | 40 | 40 | 40 | 30 | 45 | 20 |
| Gloss (60° C. mirror surface reflectance) | 90 | 98 | 95 | 93 | 93 | 92 | 91 | 93 | 85 | 75 | 92 | 93 | 56 | 80 |
| Water resistance (at 30° C. for 30 days)* | No change | No change | No change | No change | No change | No change | No change | No change | 8D | No change | 8D | 6D | 5D | No change |

*Measured in accordance with ASTM D-714-56.

EXAMPLES 8 TO 13

Aqueous dispersions were prepared in the same way as in Example 1 using the formulations and reaction conditions shown in Table 5, and subjected to a storage test in the same way as in Example 1. The results are also shown in Table 5.

TABLE 5

| Example | 8 | 9 | 10 | 11 | 12 | 13 |
|---|---|---|---|---|---|---|
| Step 1 | | | | | | |
| Solvent | | | | | | |
| Ethylene glycol monomethyl ether | — | — | — | 50 | — | — |
| Ethylene glycol monoethyl ether | — | — | — | — | — | 50 |
| Ethylene glycol monobutyl ether | 100 | — | 50 | — | — | — |
| Propylene glycol monoethyl ether | — | — | — | — | 50 | — |
| Propylene glycol monobutyl ether | — | — | 50 | — | — | — |
| Dipropylene glycol monomethyl ether | — | — | — | — | — | 50 |
| Dipropylene glycol monoethyl ether | — | 50 | — | — | — | — |
| n-Butanol | — | — | — | 50 | — | — |

TABLE 5-continued

| Example | 8 | 9 | 10 | 11 | 12 | 13 |
|---|---|---|---|---|---|---|
| Diethylene glycol monomethyl ether | — | 50 | — | — | — | — |
| Diethylene glycol monoethyl ether | — | — | — | — | 50 | — |
| Monomer | | | | | | |
| Styrene | 22.2 | — | 30 | 30 | — | 40 |
| n-Butyl acrylate | — | 43.6 | — | — | — | — |
| iso-Butyl acrylate | — | — | 26.3 | — | 39 | — |
| Methyl methacrylate | — | 17 | — | — | 25 | — |
| Ethyl methacrylate | — | — | 20 | — | — | — |
| n-Butyl methacrylate | 26.0 | — | — | 44 | — | — |
| Lauryl methacrylate | — | 20 | — | — | — | — |
| 2-Ethylhexyl acrylate | 30 | — | — | — | — | 28.5 |
| iso-Butyl methacrylate | — | — | — | — | 10 | — |
| Hydroxyethyl acrylate | — | 10 | — | — | — | 10 |
| Hydroxyethyl methacrylate | 15 | — | 15 | — | 15 | — |
| Hydroxypropyl methacrylate | — | — | — | 15 | — | 8 |
| Acrylic acid | 6.5 | 7 | 8 | 10.3 | 10.3 | 12.8 |
| Catalyst | | | | | | |
| Azobisisobutyronitrile | 3 | — | — | 2 | — | — |
| Benzoyl peroxide | — | — | — | — | 2 | — |
| t-Butyl peroxybenzoate | — | 0.7 | — | — | — | 2 |
| t-Butyl peroxyoctoate | — | — | 2 | — | — | — |
| Reaction temperature (°C.) | 100 | 100 | 120 | under reflux | 100 | 120 |
| Step 2 | | | | | | |
| Monomer | | | | | | |
| Hydroquinone | 0.1 | — | — | 0.1 | 0.1 | 0.1 |
| Monomethoxyhydroquinone | — | 0.2 | — | — | — | — |
| Catechol | — | — | 0.1 | — | — | — |
| Tetraethyl ammonium bromide | 0.2 | 0.2 | — | — | — | 0.2 |
| Tetraethyl ammonium chloride | — | — | 0.2 | — | — | — |
| Triethylamine | — | — | — | 0.1 | — | — |
| Dimethylbenzylamine | — | — | — | — | 0.2 | — |
| Glycidyl acrylate | — | 2.4 | — | — | — | — |
| Glycidyl methacrylate | 0.7 | — | 0.7 | 0.7 | 0.7 | 0.7 |
| Reaction temperature (°C.) | 100 | 100 | 120 | under reflux | 100 | 120 |
| Step 3 | | | | | | |
| Polymer solution obtained in step 2 | 100 | 80 | 30 | 70 | 50 | 40 |
| Solvent | | | | | | |
| Diethylene glycol monomethyl ether | — | — | 35 | — | — | — |
| Ethylene glycol monobutyl ether | — | — | — | — | — | 25 |
| Propylene glycol monoethyl ether | — | — | — | — | 20 | — |
| Monomer | | | | | | |
| Styrene | 10.0 | — | 30 | 18 | — | — |
| Vinyltoluene | — | 10 | — | — | — | — |
| n-Butylacrylate | 29.0 | — | — | 33.5 | — | — |
| n-Butyl methacrylate | — | 40 | — | — | — | — |
| Ethyl acrylate | — | — | — | — | — | 10 |
| Methyl methacrylate | — | — | — | — | — | 10 |
| Ethyl methacrylate | — | — | — | — | — | 25.8 |
| 2-Ethylhexyl acrylate | — | — | — | — | 35.2 | — |
| 2-Ethylhexyl methacrylate | — | — | 39.8 | — | — | — |
| iso-Butyl methacrylate | — | — | — | — | 25 | — |
| Lauryl methacrylate | — | — | — | — | — | 20 |
| Hydroxyethyl methacrylate | — | — | 13 | — | 12 | — |
| Hydroxypropyl methacrylate | 10.0 | — | — | 12 | — | 13 |
| N-butoxymethylol acrylamide | — | 10 | — | — | — | — |
| Acrylic acid | 1.0 | — | 2.2 | — | — | 1.2 |
| Methacrylic acid | — | — | — | 1.5 | 2.8 | — |
| Catalyst | | | | | | |
| Azobisisobutyronitrile (the parenthesized figures represent the amounts of additional | 1.0 (0.5) | — | — | 3.5 (0.5) | — | — |

TABLE 5-continued

| Example | 8 | 9 | 10 | 11 | 12 | 13 |
|---|---|---|---|---|---|---|
| supply; the same applies to the other catalysts) | | | | | | |
| Benzoyl peroxide | — | — | — | — | 1.0 (0.5) | — |
| t-Butyl peroxybenzoate | — | 0.7 (0.5) | — | — | — | 1.5 (0.5) |
| n-Octylmercaptan | — | — | — | — | 0.2 | — |
| t-Butyl peroxybenzoate | — | — | 1.5 (0.5) | — | — | — |
| Reaction temperature (°C.) | 120 | 100 | 120 | under reflux | 100 | 120 |
| Step 4 Neutralizing agent | | | | | | |
| Dimethylamino ethanol (the parenthesized figures represent the equivalent weight of neutralization; the same applies to the other neutralizing agents) | — | 2.66 (1.0) | — | — | 3.59 (0.6) | |
| N-methylmorpholine | — | — | 4.64 (0.8) | — | — | — |
| N-ethylmorpholine | — | — | — | 4.80 (0.6) | — | — |
| Triethylamine | 5.1 | — | — | — | — | 5.1 (1.0) |
| Water | 125 | 135 | 130 | 140 | 130 | 135 |
| Acid value of the polymer obtained in step 2 | 42.1 | 42.1 | 57.7 | 77.9 | 77.9 | 96.6 |
| Acid value of the monomeric mixture in step 3 | 15.6 | 0 | 20.1 | 15.1 | 24.4 | 11.7 |
| Acid value of the acrylic graft polymer | 28.4 | 16.8 | 25.8 | 38.7 | 37.7 | 28.7 |
| Glass transition temperature (°C.) of the acrylic graft polymer | −5.5 | 6.8 | 35.3 | 8.3 | −3.9 | 18.9 |
| Viscosity of the aqueous dispersion (solids content 35%; centipoises at 25° C.) | 180 | 53 | 210 | 120 | 155 | 95 |
| Water content (%) in the volatile component of the aqueous dispersion | 68 | 73 | 70 | 75 | 70 | 73 |
| Appearance of the aqueous dispersion | Opalescent | Opalescent | Opalescent | Opalescent | Opalescent | Opalescent |
| Stability of the aqueous dispersion (50° C., 1 month) | Stable | Stable | Stable | Stable | Stable | Stable |

*The additional catalysts in step 3 were used as a solution in 5 parts of the solvent used in step 1.

EXAMPLE 14

A mixture of the following ingredients was added dropwise over 2 hours to 100 parts of stirred isopropanol under reflux.

| | |
|---|---|
| Styrene | 20 parts |
| n-Butyl acrylate | 40.3 parts |
| Acrylic acid | 26 parts |
| Hydroxyethyl acrylate | 13 parts |
| n-Octylmercaptan | 0.5 part |
| Benzoyl peroxide | 3 parts |

The mixture was heated further for 3 hours, and then a mixture of the following ingredients was added.

| | |
|---|---|
| Hydroquinone | 0.1 part |
| Glycidyl methacrylate | 0.7 part |
| Dimethylbenzylamine | 0.2 part |

The mixture was heated for 4 hours to afford a solution of an acrylic copolymer having an acid value of 197.9. Isopropyl alcohol (80 parts) was added to 20 parts of the resin solution, and under reflux, a mixture of the following ingredients was added dropwise over 2 hours.

| | |
|---|---|
| Styrene | 25 parts |
| Ethyl methacrylate | 20 parts |
| n-Butyl methacrylate | 30 parts |
| Hydroxypropyl methacrylate | 15 parts |
| Benzoyl peroxide | 1.8 parts |
| n-Octylmercaptan | 0.5 part |

The mixture was heated further for 1 hour, and a solution of 0.5 parts of benzoyl peroxide in 10 parts of isopropanol was added dropwise over 1 hour. The mixture was further heated for 3 hours. The resulting acrylic graft polymer had an acid value of 19.8 and a glass transition temperature of 44.1° C.

Then, 3.14 parts (1.0 equivalent to the carboxyl group) of dimethylaminoethanol was added to the graft polymer solution, and the mixture was stirred. Water (127 parts) was then added, and the mixture was stirred until a uniform solution was obtained. Then, 80 parts of isopropanol was distilled off from the solution by distillation under reduced pressure. The solution obtained was an opalescent aqueous dispersion of acrylic graft polymer having a viscosity of 25 centipoises at 25° C. and a water content in the volatile component of 4.6%. When the aqueous dispersion was stored at 50° C. for 1 month, it remained stable.

EXAMPLE 15

In each run, a water-dispersed coating composition of this invention was prepared in accordance with the formulation (parts by weight) shown in Table 6 using each of the aqueous dispersions obtained in Examples 8 to 14. The resulting coating composition was diluted to adjust its viscosity to 40 seconds in Ford Cup #4 (25° C.). The coating composition was spray-coated on a zinc phosphate-treated steel sheet, and baked at 160° C. for 20 minutes.

The cured coating was tested, and the results are shown in Table 7.

TABLE 6

| Coating composition | 15 | 16 | 17 | 18 | 19 | 20 | 21 |
|---|---|---|---|---|---|---|---|
| Example No. of the aqueous dispersion used | 8 | 9 | 10 | 11 | 12 | 13 | 14 |
| Amount (as solids) of the aqueous dispersion used | 70 | 100 | 85 | 70 | 80 | 70 | 65 |
| Amino resin | | | | | | | |
| Cymel 303 | 30 | — | — | — | 20 | — | — |
| Cymel 370 | — | — | — | 30 | — | — | 35 |
| Sumimal M66B | — | — | 15 | — | — | — | — |
| Yuban XV-120 | — | — | — | — | — | 30 | — |
| Rutile titanium white | 100 | 100 | 100 | 100 | 100 | 100 | 100 |
| p-Toluenesulfonic acid | 1 | — | — | — | — | — | — |
| Ethylene glycol monoethyl ether | 10 | 25 | 10 | 10 | 10 | 20 | — |
| Solids content (%) | 56 | 47 | 55 | 57 | 54 | 54 | 62 |
| Water content (%) in the volatile component | 67 | 67 | 65 | 72 | 68 | 68 | 85 |
| Stability of the coating composition (stored at 50° C. for 1 month) | Stable | Stable | Stable | Stable | Stable | Stable | Stable |

TABLE 7

| Coating composition | 15 | 16 | 17 | 18 | 19 | 20 | 21 |
|---|---|---|---|---|---|---|---|
| Critical film thickness for popping (microns) | 35 | 35 | 40 | 35 | 40 | 40 | 35 |
| Critical film thickness for sagging (microns) | 45 | 40 | 50 | 45 | 50 | 45 | 50 |
| Glass (60° mirror surface reflectance) | 92 | 91 | 95 | 93 | 97 | 96 | 92 |
| Water resistance (40° C., 30 days in accordance with ASTM D-714-56) | No change | No change | No change | No change | No change | No change | change |

What we claim is:

1. A water-dispersed coating composition comprising
(1) a dispersion of a water-dispersible form of an acrylic graft polymer containing carboxyl groups and hydroxyl and/or amide groups in an aqueous medium containing 60 to 90% by weight of water, said water-dispersible form being obtained by neutralizing at least 50% of the carboxyl groups of said acrylic graft polymer with a basic substance, said acrylic graft polymer having, prior to said neutralization, an acid value of 15 to 40 and a glass transition temperature of −10° C. to 70° C. and being produced by polymerizing, at a temperature of from about 60° to about 150° C., (A) an acrylic copolymer containing carboxyl groups, unsaturated groups and optionally hydroxyl and/or amide groups, said acrylic copolymer being obtained by reacting 100 parts by weight of an acrylic polymer having carboxyl groups and optionally hydroxyl and/or amide groups with 0.2 to 3.0 parts by weight of an unsaturated monomer containing a glycidyl group in a hydrophilic organic solvent, and (B) a mixture of an alpha,beta-ethylenically unsaturated carboxylic acid and another copolymerizalbe unsaturated monomer, the weight ratio of (A) to (B) being 5-95 parts of (A) to 5-95 parts per total of 100 parts of (A) and (B), said other copolymerizable unsaturated monomer optionally containing a copolymerizable unsaturated monomer having hydroxyl and/or amide groups, said acrylic copolymer (A) and said mixture (B) being selected so that either one of them has hydroxyl and/or amide groups and the difference between the acid value of said acrylic copolymer (A) and the acid value of said mixture (B) is from 25 to 200, and
(2) at least one amino resin selected from the group consisting of melamine/formaldehyde resin, urea/formaldehyde resin, guanamine/formaldehyde resin, benzoguanamine/formaldehyde resin and acetoguanamine/formaldehyde resin.

2. The composition of claim 1 wherein said acrylic graft polymer before neutralization of its carboxyl groups with a basic substance has an acid value of 15 to 30.

3. The composition of claim 1 wherein said acrylic graft polymer before neutralization of its carboxyl groups with a basic substance has a glass transition temperature of from −10° C. to 50° C.

4. The composition of claim 1, 2 or 3 wherein said basic substannce is an alkali metal hydroxide, ammonia or an amine.

5. The composition of claim 4 wherein said alkali metal hydroxide is sodium hydroxide or potassium hydroxide.

6. The composition of claim 4 wherein said amine is a primary, secondary or tertiary alkylamine, cycloalkylamine or alkanolamine.

7. The composition of claim 1 wherein said aqueous medium consists of 60 to 90% by weight of water and 40 to 10% by weiht of a hydrophilic organic solvent.

8. The composition of claim 7 wherein said hydrophilic organic solvent is an alcohol having 1 to 8 carbon atoms, an alkylene glycol having 2 or 3 carbon atoms, or a mono-$C_{1-8}$ alkyl-ether or di-$C_{1-8}$ alkyl-ether of said alkylene glycol.

9. The composition of claim 1 wherein said acrylic polymer used in the production of the acrylic copolymer (A) is a copolymer of an alpha,beta-ethylenically unsaturated carboxylic acid and another copolymerizable unsaturated monomer.

10. The composition of claim 9 wherein said alpha,-beta-ethylenically unsaturated carboxylic acid contains 3 to 8 carbon atoms and contains 1 or 2 carboxyl groups.

11. The composition of claim 10 wherein said alpha,-beta-ethylenically unsaturated carboxylic acid is a compound of the following formula

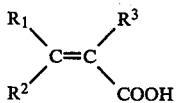

wherein $R^1$ represents hydrogen or alkyl having 1 to 5 carbon atoms, $R^2$ represents hydrogen carboxyl or alkyl having 1 to 5 carbon atoms, and $R^3$ represents hydrogen alkoxycarbonyl having 2 to 6 carbon atoms, or alkyl having 1 to 5 carbon atoms.

12. The composition of claim 9 wherein said other copolymerizable unsaturated monomer is at least one member selected from the group consisting of acrylic or methacrylic acid esters, acrylic or methacrylic acid amides, vinyl aromatic compounds and other ethylenic monomers.

13. The composition of claim 12 wherein the acrylic or methacrylic acid esters are the alkyl, alkoxyalkyl, alkenyl, hydroxyalkyl, mono- or di-alkylaminoalkyl or alkenyloxyalkyl esters of acrylic or methacrylic acid.

14. The composition of claim 12 wherein said copolymerizable unsaturated monomer comprises at least one member selected from the group consisting of hydroxyalkyl acrylates, hydroxyalkyl methacrylates, acrylic acid amides, and methacrylic acid amides.

15. The composition of claim 1 wherein said glycidyl-containing unsaturated monomer used in the production of the acrylic copolymer (A) is a compound containing one glycidyl group and one ethylenically unsaturated bond.

16. The composition of claim 1 wherein said hydrophilic organic solvent used in the production of the acrylic copolymer (A) is at least one member selected from the group consisting of alcohols having 1 to 8 carbon atoms, alkylene glycols having 2 or 3 carbon atoms, and mono- or di-$C_{1-8}$ alkyl ethers of said alkylene glycols.

17. The composition of claim 1 wherein said alpha,-beta-ethylenically unsaturated carboxylic acid in said mixture (B) contains 3 to 8 carbon atoms and contains 1 or 2 carboxyl groups.

18. The composition of claim 1 wherein said other copolymerizable unsaturated monomer in said mixture (B) is at least one member selected from the group consisting of acrylic or methacrylic acid esters, acrylic or methacrylic acid amides, vinyl aromatic compounds and other ethylenically unsaturated monomers.

19. The composition of claim 1 wherein said mixture (B) comprises at least one member selected from the group consisting of hydroxylalkyl acrylates, hydroxyalkyl methacrylates, acrylic acid amides and methacrylic acid amides.

20. The composition of claim 1 wherein said acrylic copolymer (A) has an acid value of from 40 to 200 and said mixture (B) has an acid value of not more than 30.

21. The composition of claim 1 wherein said acrylic copolymer (A) has an acid value of not more than 30, and said mixture (B) has an acid value of from 40 to 200.

22. A water-dispersed coating composition comprising a dispersion of a water-dispersible form of a self-curable acrylic graft polymer having carboxyl groups, self-curable amide groups and optionally hydroxyl groups in an aqueous medium containing 60 to 90% by weight of water, said water-dispersible form being obtained by neutralizing at least 50% of the carboxyl groups of said self-curable acrylic graft polymer with a basic substance, said acrylic graft polymer having, prior to said neutralization, an acid value of 15 to 40 and a glass transition temperature of −10° C. to 70° C. and being produced by polymerizing, at a temperature of from about 60° to about 150° C., (A) an acrylic copolymer having carboxyl groups, unsaturated groups and optionally self-curable amide groups, said acrylic copolymer being obtaineed by reacting 100 parts by weight of an acrylic polymer having carboxyl groups and optionally self-curable amide groups with 0.2 to 3.0 parts by weight of an unsaturated monomer containing a glycidyl group in a hydrophilic organic solvent, and (B) a mixture of an alpha,beta-ethylenically unsaturated carboxylic acid and another copolymerizable unsaturated monomer, the weight ratio of (A) to (B) being 5-95 parts of (A) to 5-95 parts of (B) per total of 100 parts of (A) and (B), said other copolymerizable unsaturated monomer optionally containing a copolymerizable unsaturated monomer having self-curable amide groups, said acrylic copolymer (A) and said mixture (B) being selected so that either one of them has self-curable amide groups and the difference between the acid value of said acrylic copolymer (A) and the acid value of said mixture (B) is from 25 to 200.

23. The composition of claim 22 wherein said acrylic polymer used in the production of the acrylic copolymer (A) is a copolymer of an alpha,beta-ethylenically unsaturated carboxylic acid and another copolymerizable unsaturated monomer.

24. The composition of claim 23 wherein said other copolymerizable unsaturated monomer comprises a copolymerizable unsaturated monomer having a self-curable amide group.

25. The composition of claim 24 wherein said copolymerizable unsaturated monomer having a self-curable amide group is at least one member selected from the group consisting of N-alkoxymethylolacrylamides and N-alkoxymethylolmethacrylamides.

26. The composition of claim 22 wherein said copolymerizable unsaturated monomer in said mixture (B) comprises a copolymerizable unsaturated monomer having a self-curable amide group.

27. The composition of claim 26 wherein said copolymerizable unsaturated monomer having a self-curable amide group is at least one member selected from the group consisting of N-alkoxymethylolacrylamides and N-alkoxymethylolmethacrylamides.

* * * * *